Jan. 12, 1954
W. G. EVERSOLE ET AL
2,666,145
LUMINESCENT CRYSTALLINE BODIES
Filed June 18, 1949
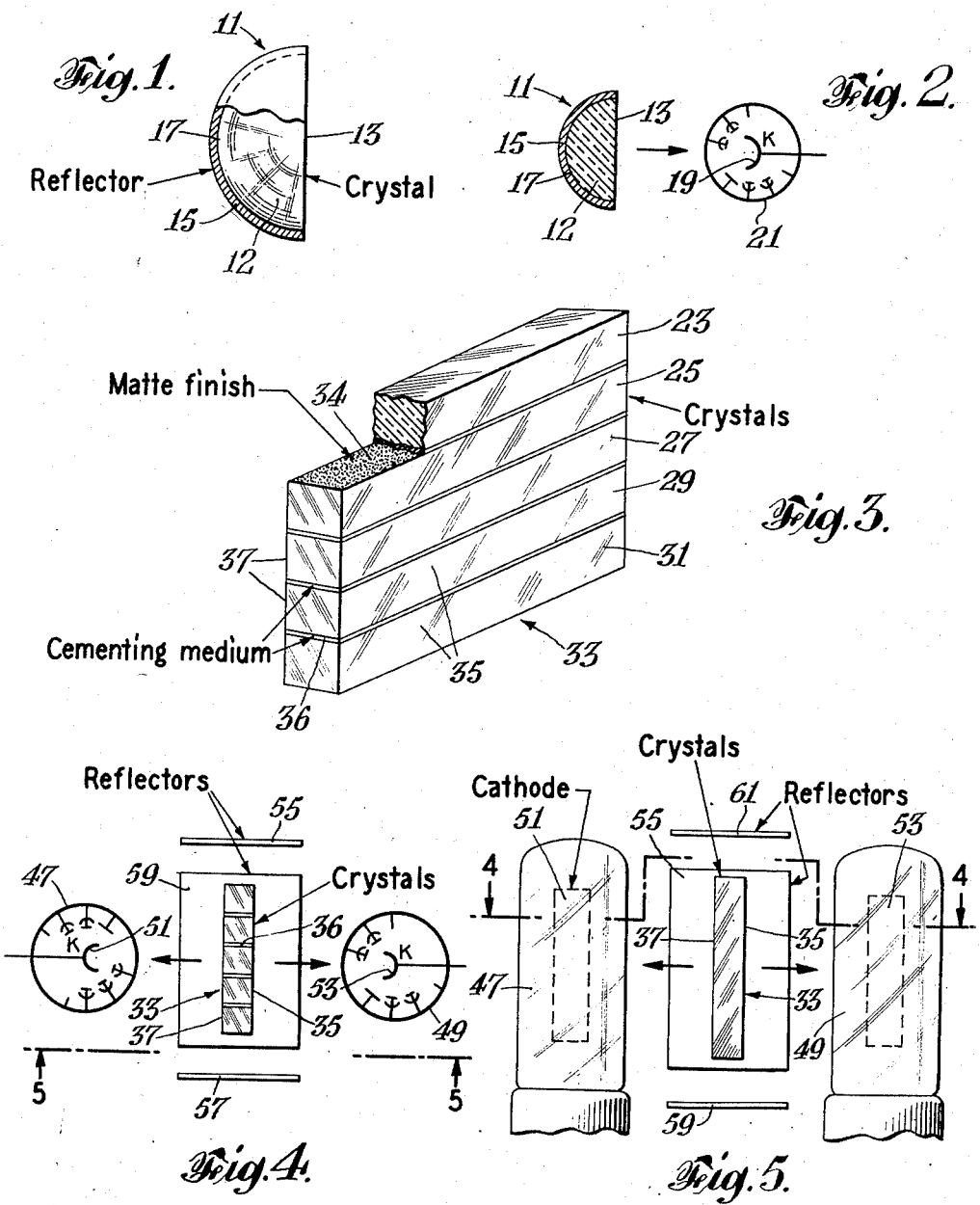
INVENTORS
WILLIAM G. EVERSOLE
BRIAN O'BRIEN
ROGER H. GILLETTE
BY
ATTORNEY Patented Jan. 12, 1954

2,666,145

UNITED STATES PATENT OFFICE 2,666,145

LUMINESCENT CRYSTALLINE BODIES

William G. Eversole, Kenmore, Brian O'Brien, East Rochester, and Roger H. Gillette, Kenmore, N. Y., assignors, by mesne assignments, to Union Carbide and Carbon Corporation, a corporation of New York Application June 18, 1949, Serial No. 99,994

9 Claims. (Cl. 250—71)

1

This invention relates to improved luminescent crystalline bodies, and is also concerned with improved instruments of the type used for measuring the intensity of ionizing particles or quanta such as alpha, beta, or gamma rays.

The detecting and measuring of radioactivity has become of considerable importance since the development of the atomic bomb. One type of instrument that has been found successful for this purpose employs a luminescent body positioned adjacent to a phototube so that light flashes or scintillations emitted by the body as the result of impinging ionizing particles or quanta are detected and counted. Such devices, commonly called scintillation counters, may be of either the integrating or counting type.

Among the luminescent bodies which have been used successfully are crystals of calcium and cadmium tungstates, zinc and cadmium sulfides, anthracene, naphthalene, and thallium-activated sodium and potassium iodides. While all of these crystals function to a more or less satisfactory degree, it has been found that in general the sensitivity of the instrument is low. In the first place, the quantity of light emitted by the crystal in each flash is only a small proportion of the total amount of light actually generated as the result of radiation. This is because when light is generated within such a crystal, total reflection occurs of that portion which strikes the crystal boundaries at angles greater than the critical angle, so that much of the light is trapped within the crystal and never emerges therefrom. Since the critical angle becomes smaller as the refractive index of the material increases, the amount of light entrapped will be greater for materials of higher refractive index such as calcium tungstate ($n=1.93$) and cadmium tungstate ($n=2.3$). For example, in these two materials, over 80 per cent of the light generated within a crystal having the shape of a polished rectangular parallelepiped is permanently trapped due to total reflection.

Another problem associated with these instruments has been that of utilizing any appreciable fraction of the total light generated within the luminescent crystal for exciting the photosensitive cathode of the phototube.

An object of the present invention is to provide novel luminescent crystalline bodies wherein the trapping of light due to total reflection is considerably reduced, and wherein the proportion of light leaving such bodies in specific directions is considerably increased. Another object is to increase the concentration of light rays leaving luminescent crystals in specific directions. Another object is to provide scintillation counters of improved sensitivity. Still another object is to provide a novel process for making a luminescent synthetic alkaline earth metal tungstate crystal wherein the trapping of light due to total reflection is considerably less than in previously available tungstate crystals.

The above and other objects, and the novel features of the invention, will become apparent from the following detailed description, having reference to the accompanying drawings wherein:

Fig. 1 is a side elevational view, partly broken away and in section, of one type of luminescent crystalline body in accordance with the invention;

Fig. 2 is a schematic plan view, part being in vertical midsection, of a scintillation counter employing the crystalline body of Fig. 1;

Fig. 3 is a perspective view, partly broken away and in cross section, of another type of luminescent crystalline body in accordance with the invention;

Fig. 4 is a schematic sectional view taken along the line 4—4 of Fig. 5, showing a coincidence type of scintillation counter embodying the crystalline body of Fig. 3; and Fig. 5 is a view taken along the line 5—5 in Fig. 4.

In accordance with the present invention, the trapping of light due to total reflection at a boundary surface of a luminescent crystal is reduced considerably and the illuminating efficiency of such a body is increased correspondingly by providing the crystal with light-scattering means to diffuse light at the crystal boundaries or within the body of the crystal. There are several specific ways of accomplishing this, which will be described in detail hereinafter, but the best results are obtained by a combination of such ways.

In further accordance with the invention, the efficiency of utilization of the light from a luminescent crystal is increased by reducing the solid angle into which the internally generated light radiates to one or more specific directions by providing the crystal with a convex surface and by covering the convex surface with a layer or film of a light-reflecting material which is impervious to light and pervious to the ionizing particles and quanta.

In Fig. 1 there is shown a hemispherical luminescent crystalline body 11 comprising a hemispherical luminescent crystal 12 having a flat polished front surface 13, and a reflector 15 secured on the hemispherical surface 17 of the crystal in any suitable way, as by an adhesive or by crimping. The reflector 15 is a light-reflecting material such as metal foil or an evaporated metal film which is transparent to ionizing particles and quanta such as beta and gamma radiations, but which is opaque to visible light. It will be evident that in some cases it may be desirable to use a hemicylindrical or hemiellipsoidal body rather than a hemispherical body.

When using the luminescent crystalline body of Fig. 1 in a scintillation counter it is positioned with the flat polished light-emitting surface area 13 facing toward the cathode 19 of a phototube 21 and with the convex hemispherical surface 17 facing away from the cathode so that light emitted within the crystal 11 is directed by the reflector 15 toward the cathode, thus increasing the sensitivity of the instrument to ionizing particles or quanta in the vicinity. It has been found that this construction increases the response of the phototube more than 2.2 times when a crystal 12 of synthetic Scheelite (calcium tungstate) with a reflector 15 of aluminum foil crimped on the hemispherical surface 17 of the crystal is exposed to 0.3 Roentgen per hour of gamma radiation.

Phototube 21 may be a photomultiplier tube of the RCA 931 A type. The electrical circuit of the instrument is of a conventional nature, for example as shown on page 763 of "Review of Scientific Instruments," volume 19, illustrating the article by Marshall entitled "The Photo-Multiplier Radiation Detector."

A second type of luminescent crystalline body having improved illuminating efficiency as a result of the invention is shown in Fig. 3, wherein a number of long thin mono-crystalline bars 23, 25, 27, 29 and 31 of luminescent material such as calcium tungstate are joined side-by-side to form a thin plate 33. In order to provide light diffusing surfaces at the boundaries between crystals, the adjoining internal surfaces of the several bars are ground or otherwise provided with a rough matte finish as shown at 34 on bar 25. The bars may be juxtaposed and clamped together, or alternatively, thin layers such as at 36 of a cement with a refractive index different from that of the crystals can be used to fasten the bars together. Canada balsam may be used as the cementing medium. In lieu of a matte finish on adjoining surfaces (or in addition thereto) light scattering or diffusing can be accomplished by incorporating finely-divided transparent particles in the cement to serve as light scattering or diffusing centers. For example, Canada balsam containing rutile particles can be used as the cementing medium. A surface treated as described above acts as a diffuse reflector and at the same time exercises very little light absorption. Consequently light which suffers total reflection at the adjoining crystal surfaces is changed in direction by the diffusing surface thereby increasing the probability that it will reach another surface at an angle less than the critical angle. The total absorption path in the crystal is thereby decreased. The external faces of plate 33 may be either ground or polished.

An important manner of using luminescent crystals for detection of ionizing particles and quanta is shown in Figs. 4 and 5, where a single mosaic plate 33 is symmetrically located between the two phototubes 47 and 49 of a coincidence type of scintillation counter. As will be readily understood by those acquainted with such matters, this arrangement permits the measurement and recording of only those scintillations which reach the two phototubes simultaneously. As is also well-known, this so-called coincidence arrangement can be so used as to reduce considerably the background of pulses due to random processes, cosmic ray backgrounds, etc. which affect the two phototubes unequally. Such an arrangement is described by Morton and Robinson in an article entitled, "A Coincidence Scintillation Counter" which appeared in Nucleonics, volume 4, p. 25 (February 1949).

When using a crystalline plate 33 in a coincidence type of scintillation counter, as shown in Figs. 4 and 5, the plate is positioned vertically between a pair of phototubes 47 and 49 with the side faces 35 and 37 facing the respective cathodes 51 and 53. Light reflectors 55, 57, 59 and 61 of any suitable material may be positioned opposite the four edge surfaces of the crystal plate to confine emitted light to the locality of the phototubes.

In a crystalline plate 33 formed of a plurality of bars of calcium tungstate one inch long and of square cross section approximately one-eighth inch on the side having a rough matte finish on adjoining surfaces, the calculated light emission from the side crystal faces 35 and 37 is more than twice as great as when using a similar crystal body without the rough matter finish between crystal bars, even when making a very conservative allowance for light loss within the crystal due to absorption. This is achieved without loss of symmetry in the emission of light from the crystal plate. Thus the two phototubes receive a substantially equal number of light quanta for each exciting particle or gamma ray quantum absorbed.

Another means for decreasing total reflection and increasing the quantity of light leaving a luminscent crystalline body is to incorporate in the crystal inclusions of a suitable transparent contaminating material which acts to scatter the totally reflected light and cause the major part of this light eventually to impinge on the crystal boundaries at an angle permitting it to leave the crystal. These light-scattering impurities should be such as to absorb as small an amount of light as possible, i. e., they should be as transparent as possible. Such inclusions may be entrapped gas or air bubbles or may be particles of foreign solid material. As a specific example, it has been found that a synthetic Scheelite (calcium tungstate) crystal containing light-scattering particles of calcium oxide dispersed uniformly therein improves the relative scintillating activity of the crystal body in response to 0.3 Roentgen per hour of radiation to a value of 1.25 as compared with a value of 1.00 for a similar Scheelite crystal containing no such particles.

It should be noted that when light diffusion is effected by a foreign material, as by gaseous or solid impurities in the crystals themselves, or by the above described use of a cement containing light-scattering impurities, these foreign materials may be light absorbent. When a choice must be made between using a foreign material which is excessively light absorbent and using ground adjoining surfaces, the latter is preferred.

A synthetic Scheelite crystal containing particles of a light-scattering impurity can be prepared by the well-known Verneuil process, as described and illustrated schematically in United States Patent No. 1,004,505, and also by the process described in the copending U. S. patent application Serial No. 93,956 of William G. Eversole, filed May 18, 1949. To prepare the improved crystal of the present invention a base powder consisting of calcium tungstate powder, or a mixture of calcium oxide and tungstic oxide in proportions to produce a pure calcium tungstate crystal, has incorporated therewith an excess quantity of a powdered oxide or oxide-forming compound of calcium equivalent to calcium oxide in an amount up to 5 per cent by weight of the base powder. The powder mixture is then dispensed downwardly through an oxyhydrogen flame and accumulates in a fused condition on a suitable support aligned with the flame, where it crystallizes progressively to form a crystal of calcium tungstate containing uniformly dispersed particles of calcium oxide as a contaminant therein. It is evident that luminescent tungstate crystals of the other alkaline earth metals can be made in the same way by employing a powder having therein alkaline earth metal, tungsten, and oxygen in proportions to form R WO$_4$ wherein R is alkaline earth metal. Also the contaminating powder may be any alkaline earth metal oxide or oxide-forming compound.

Frequently cadmium tungstate and calcium tungstate crystals grown by the Verneuil process contain large numbers of tiny gas bubbles. Such crystals also are suitable because the bubbles diffuse light and thus decrease light entrapment.

While different types of crystalline bodies having improved illuminating efficiency have been described individually to illustrate the principles of the invention, it is evident that the best results can be obtained by combining all novel features to provide superior luminescent crystalline bodies for use in scintillation counters. For example, in the scintillation counter shown schematically in Fig. 2, best results are obtained when the crystalline body comprises a crystal 11 containing finely-dispersed particles of a light-scattering contaminant, and when the convex surface 17 has a rough matte finish thereon under the reflector 15. Obviously this is also true of other shapes of crystal bodies used in an arrangement such as that of Fig. 2, for example when the crystal itself is a flat plate.

What is claimed is:

1. A luminescent body of a transparent material designed to emit light concentrated in one or more specific directions when irradiated, said body comprising a plurality of luminescent single crystals secured together side-by-side with surfaces adjoining one another, adjoining surfaces of said crystals having a rough matte finish thereon, said matte finish acting to reduce trapping of light due to total reflection in said crystals and to increase the quantity of light leaving said crystals in said specific directions during exposure thereof to ionizing particles and quanta.

2. A body in accordance with claim 1 wherein said luminescent crystals are at least one substance selected from the group consisting of calcium tungstate and cadmium tungstate.

3. A luminescent crystalline body having a transparent light-scattering contaminant dispersed therein to reduce total reflection within said crystalline body and to increase the quantity of light leaving said crystalline body during exposure thereof to ionizing particles and quanta, said body being a substance selected from the group consisting of calcium tungstate and cadmium tungstate and said contaminant being a plurality of gas bubbles dispersed within each crystal.

4. A luminescent crystalline body comprising a plurality of luminescent crystals arranged side-by-side with adjoining surfaces, cement between said surfaces holding said crystals together, and a plurality of transparent particles of a light-scattering material embedded in said cement to reduce total reflection within said crystalline body and to increase the quantity of light leaving said crystalline body during exposure thereof to ionizing particles and quanta.

5. In a scintillation counter comprising, in combination, a phototube having a light-responsive cathode, and a luminescent crystalline body so positioned as to illuminate said cathode when said crystalline body is exposed to ionizing particles and quanta, the improvement which comprises: providing said crystalline body as a body having light-emitting surface areas facing toward said cathode and a convex surface facing away from said cathode, said body having light-reflecting material on said convex surface, said reflecting material being opaque to light rays but transparent to ionizing particles and quanta to increase the quantity of light leaving said crystalline body toward said cathode.

6. In a scintillation counter comprising, in combination, phototube means having light-responsive cathode means, and a luminescent crystalline body so positioned as to illuminate said cathode means when said crystalline body is exposed to ionizing particles and quanta, the improvement which comprises: providing said crystalline body as a body comprising a plurality of luminescent crystals secured together with adjoining surfaces, said adjoining surfaces having a rough matte finish thereon, said matte finish acting to reduce total reflection in said crystals and to increase the quantity of light leaving said crystalline body toward said cathode means during exposure of said crystalline body to ionizing particles and quanta.

7. In a scintillation counter comprising, in combination, phototube means having light-responsive cathode means, and a luminescent body positioned adjacent said phototube means in position to illuminate said cathode means when said body is exposed to ionizing particles and quanta, the improvement which comprises: providing said body as a luminescent crystalline body having small discrete inclusions of particles of a light-scattering contaminant dispersed therein to reduce total reflection within said crystalline body and to increase the quantity of light leaving said crystalline body during exposure thereof to ionizing particles and quanta, said crystalline body comprising one or more crystals of a material selected from the group consisting of calcium tungstate and cadmium tungstate having a plurality of gas bubbles dispersed within each crystal.

8. In a scintillation counter comprising, in combination, phototube means having light-responsive cathode means, and a luminescent body positioned adjacent said phototube means in position to illuminate said cathode means when said body is exposed to ionizing particles and quanta, the improvement which comprises: providing said body as a crystalline body comprising a plurality of luminescent crystals arranged side-by-side with adjoining surfaces, cement between said adjoining surfaces holding said crystals together, and a plurality of transparent particles of a light-scattering material embedded in said cement to reduce total reflection within said crystalline body and to increase the quantity of light leaving said crystalline body during exposure thereof to ionizing particles and quanta.

9. In a scintillation counter comprising, in combination, phototube means having light-responsive cathode means, and a luminescent crystalline body so positioned as to illuminate said cathode means when said crystalline body is exposed to ionizing particles and quanta, the improvement which comprises: said crystalline body comprising a plurality of luminescent crystals secured together with adjoining surfaces, means between said crystals for scattering light to reduce total reflection in said crystals and to increase the quantity of light leaving said crystalline body toward said cathode means during exposure of said crystalline body to ionizing particles and quanta, and light-reflecting means which is transparent to ionizing particles and quanta located adjacent the areas of said crystalline body which face away from said cathode means.

WILLIAM G. EVERSOLE.
BRIAN O'BRIEN.
ROGER H. GILLETTE.

References Cited in the file of this patent

UNITED STATES PATENTS

| Number | Name | Date |
|---|---|---|
| 988,230 | Verneuil | Mar. 28, 1911 |
| 1,565,777 | Bertolini | Dec. 15, 1925 |
| 2,233,786 | Law | Mar. 4, 1941 |
| 2,436,182 | Schmidling | Feb. 17, 1948 |
| 2,448,963 | Dicke | Sept. 7, 1948 |
| 2,517,404 | Morton | Aug. 1, 1950 |

OTHER REFERENCES

Single Crystal Growth of Scheelite by S. Zerfoss et al., Physical Review, January 15, 1949, page 320.

Inorganic Crystals for the Detection of High Energy Particles and Quanta by R. J. Moon, Phys. Rev., May 15, 1948, p. 1210.

Solid Luminescent materials published in 1948 by John Wiley and Sons, N. Y., Rec. in Patent Office Library July 6, 1948, p. 45.